D. A. ORE.
BAIT CARRYING ATTACHMENT FOR FISHHOOKS.
APPLICATION FILED APR. 25, 1919.
1,325,530. Patented Dec. 23, 1919.
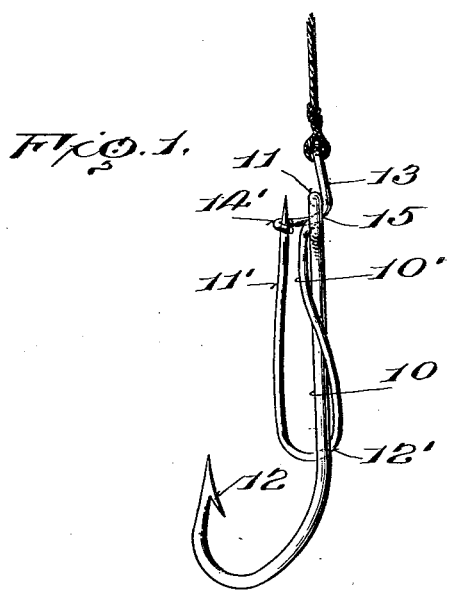
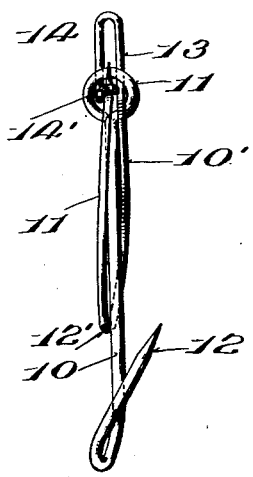
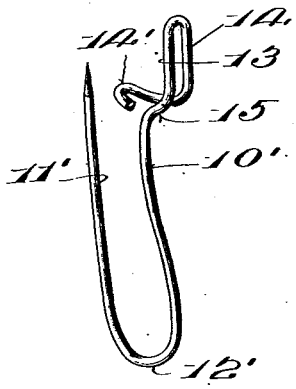
Inventor
David A. Ore.
Attorneys.

UNITED STATES PATENT OFFICE.

DAVID A. ORE, OF MOUNTAIN GROVE, MISSOURI.

BAIT-CARRYING ATTACHMENT FOR FISHHOOKS.

1,325,530. Specification of Letters Patent. Patented Dec. 23, 1919.

Application filed April 25, 1919. Serial No. 292,524.

*To all whom it may concern:*

Be it known that I, DAVID A. ORE, a citizen of the United States, residing at Mountain Grove, in the county of Wright, State of Missouri, have invented certain new and useful Improvements in Bait-Carrying Attachments for Fishhooks; and I do hereby declare the following to be a full, clear, and exact description of the invention, such as will enable others skilled in the art to which it appertains to make and use the same.

This invention relates to new and useful improvements in fishing tackle and particularly to bait-carrying attachments for hooks.
One object of the present invention is to provide a novel and improved bait-carrying attachment for a fish-hook which will hold either live or artificial bait and which will hold the same effectively against being taken by the fish.

Another object is to provide a novel and improved attachment for a fish-hook for holding bait thereon, which is constructed for ready attachment to or removal from any hook, whereby when a hook breaks the bait-carrying attachment will not be lost, or need to be thrown away, but can be detached and applied to a new hook.

Other objects and advantages will be apparent from the following description when taken in connection with the accompanying drawing.

In the drawing:

Figure 1 shows a side elevation of a fish hook having my improved bait-carrying attachment applied thereto.

Fig. 2 is a front elevation of the hook and attachment.

Fig. 3 is a perspective view of the bait-carrying attachment removed from the hook.

Referring particularly to the accompanying drawing, 10 represents the shank of the fish-hook and 11 the eye in one end thereof, while 12 represents the barbed point of the hook in connection with which my invention is adapted for use.

The attachment is preferably formed from a single length of resilient wire and is bent to provide the leg portions 10' and 11' and the connecting bight portion 12'. The outer end of the leg portion 10' is offset, as at 13 and rebent toward and parallel with the leg, in offset relation, as shown at 14, the extrem-
ity of this latter portion being bent or curved
upwardly and over the adjacent portion of
the leg, to provide a hook into which the
pointed end of the other leg 11' is adapted
to be sprung. The offset end of the leg 10'
provides a loop or eye which is passed
through the eye 11 of the fish-hook, so that
the shoulder 15, formed by these offset portions engages with the walls of the eye and
prevents movement in either direction longitudinally of the shank of the hook. When
the eye of the attachment is so disposed in
the eye of the hook, the pointed leg is passed
under the shank of the hook to the other
side thereof, whereby one leg will be disposed on one side of the shank and the other
leg on the other side, with the bight portion
engaging the back of the shank. The resiliency of the wire thus will hold the device
in proper position on the hook so that when
the pointed leg is disengaged from the hook-shaped keeper 14' the attachment will remain in firm engagement with the shank.

By disengaging the leg 11' from the
keeper 14', and swinging said leg around
behind the shank the offset eye may be readily disengaged from the eye of the hook,
thus rendering it easy to quickly remove the
attachment from the hook. The device may
as readily be applied to the hook, thus obviating the loss of the attachment should the
hook break. Furthermore, the device is
adapted to be manufactured and sold as an
article of manufacture to be applied by the
fisherman to any of his hooks, thus rendering the use of the device more general, and obviating the purchase of specially constructed or designed hooks.

What is claimed is:

1. The combination with a fish hook having an eye, of a bait carrying means associated detachably with the hook and comprising a piece of resilient wire formed with
an offset eye portion at one end engaged
through the eye of the hook and arranged
for the attachment of a line, said eye portion being formed with a keeper, the wire
being formed into an elongated loop and
having its other end extending toward the
eye portion and engaged with the said
keeper.

2. A bait holder for a fish hook formed
from a length of spring wire and including
an elongated loop, one end of the loop being formed with an offset eye portion and a hook-shaped keeper for the reception and retention of the other end of the loop, said offset eye portion being arranged for engagement through the eye of the hook and receiving one end of a line therethrough, the end portions of the loop being disposed on opposite sides of the shank of the hook and the bight portion of the loop engaged with the back of the shank.

In testimony whereof, I affix my signature in the presence of two witnesses.

DAVID A. ORE.

Witnesses:
    Mrs. C. E. ROOKSTOOL,
    MAE WHETSTINE.